United States Patent
Hui et al.

(10) Patent No.: US 8,699,368 B2
(45) Date of Patent: Apr. 15, 2014

(54) LINK RELIABILITY METRICS IN COMMUNICATION NETWORKS

(75) Inventors: Jonathan W. Hui, Foster City, CA (US); Lik Chuen Alec Woo, Union City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 13/190,859

(22) Filed: Jul. 26, 2011

(65) Prior Publication Data
US 2013/0028103 A1      Jan. 31, 2013

(51) Int. Cl.
*H04J 1/16* (2006.01)
*H04J 3/16* (2006.01)

(52) U.S. Cl.
USPC ............ 370/252; 370/256; 370/458; 370/468

(58) Field of Classification Search
USPC .......... 370/252, 256, 442, 400, 458, 459, 468
See application file for complete search history.

(56) References Cited

U.S. PATENT DOCUMENTS

| | | | |
|---|---|---|---|
| 7,388,862 B2 | 6/2008 | Tran et al. | |
| 7,424,268 B2 | 9/2008 | Diener et al. | |
| 7,564,856 B2 | 7/2009 | Bendelac et al. | |
| 7,613,128 B2 | 11/2009 | Castagnoli et al. | |
| 7,860,391 B1 | 12/2010 | Aprile et al. | |
| 7,889,131 B2 | 2/2011 | Guo et al. | |
| 2003/0083090 A1* | 5/2003 | Huh et al. .................... 455/522 |
| 2003/0087647 A1* | 5/2003 | Hurst ............................ 455/456 |
| 2005/0249186 A1* | 11/2005 | Kelsey et al. ................ 370/349 |
| 2009/0135944 A1* | 5/2009 | Dyer et al. ................... 375/267 |
| 2009/0193104 A1* | 7/2009 | Gras et al. ................... 709/223 |
| 2010/0015985 A1* | 1/2010 | Chang et al. ................ 455/442 |
| 2010/0104038 A1 | 4/2010 | Stager et al. | |
| 2011/0124340 A1* | 5/2011 | Puttonen et al. ............. 455/437 |
| 2011/0206007 A1* | 8/2011 | Chen et al. .................. 370/331 |
| 2013/0107726 A1* | 5/2013 | Hughes et al. ............... 370/252 |

OTHER PUBLICATIONS

"RPL: IPv6 Routing Protocol for Low Power and Lossy Networks" <draft-ietf-roll-rpl-19> by Winter, at al. (Mar. 13, 2011 version).

* cited by examiner

*Primary Examiner* — Andrew Lee
(74) *Attorney, Agent, or Firm* — Edwards Wildman Palmer LLP; James M. Behmke; Stephen D. LeBarron

(57) ABSTRACT

In one embodiment, a transmitter in a communication network receives an indication of active transmission times of a receiver to which the transmitter attempts to reach with first transmissions, the active transmission times indicating respective times of second transmissions initiated by the receiver. Based on determining when the first transmissions occur, the transmitter may then compute a link reliability metric for a link from the transmitter to the receiver by excluding one or more of the first transmissions from the indicated active transmission times of the second transmissions. In one embodiment, the active transmission times are in the past and the reliability metric excludes any first transmissions in the past during those times, while in another embodiment the active transmission times are scheduled in the future and the reliability metric does not include any first transmissions since the first transmissions may be scheduled to avoid the active transmission times.

25 Claims, 12 Drawing Sheets

TABLE 700 (AT NODE 31)

| PAST TX TO NODE 21 705 | SLOT (NODE 21) 710 | ACK 715 |
|---|---|---|
| A | 1 | N |
| B | 1 | Y |
| C | 2 | Y |
| D | 3 | Y |
| E | 5 | N |
| F | 5 | N |
| G | 6 | Y |

ETX = 7/4 OR 1.75

LINK RELIABILITY METRICS IN COMMUNICATION NETWORKS

TECHNICAL FIELD

The present disclosure relates generally to communication networks, and, more particularly, to link reliability metrics in communication networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. That is, to communicate a message, the transmitter must transmit the message according to the receiver's frequency hopping schedule. Note that the transmitter will often need to transmit the message on a channel different from its own receiving schedule.

Many communication devices, particularly in low-power and lossy network (LLNs), typically communicate using only a single transceiver due to cost or energy constraints. Most narrow band transceivers in use today can only be configured to transmit or receive on a single channel at a time. That is, while configured for a particular channel, the transceiver cannot transmit or receive on any other channel, and since transceivers are typically half-duplex, they do not have the ability to transmit and receive at the same time.

Because a narrow-band transceiver is limited to a single channel and is half-duplex, determining the cause of a packet drop effectively in a carrier sense multiple access (CSMA)-based network can be challenging. In particular, when a device "A" fails to receive an acknowledgment from a device "B," it does not know if the transmission was lost due to link quality issues or simply because device B was tuned to a different channel and/or transmitting at the same time.

It could be argued that transmissions while the intended receiver was busy should be included in a link reliability metric. However, doing so conflates link reliability with link congestion and utilization. It is known that the ability to separate out actual transmission failures from congestion can significantly increase system performance, especially in a lossy environment such as LLNs. In particular, searching for a different route may best solve link reliability issues, while on the other hand, simply slowing down the transmission rate to reduce congestion may solve congestion issues.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
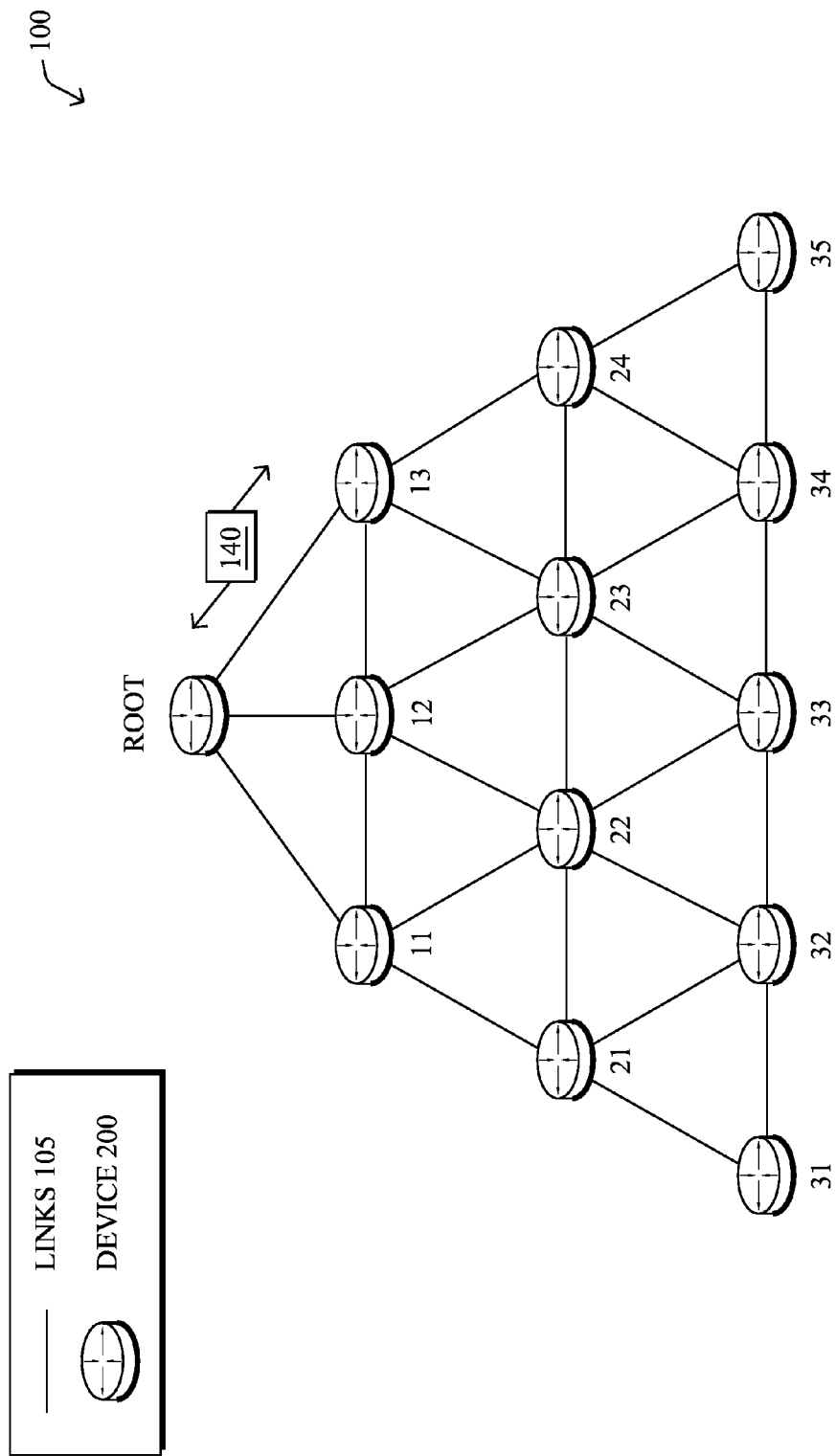
FIG. 1 illustrates an example shared-media communication network.

According to one or more embodiments of the disclosure, a transmitter in a communication network receives an indication of active transmission times of a receiver to which the transmitter attempts to reach with one or more first transmissions, the active transmission times indicating respective times of one or more second transmissions initiated by the receiver. Based on determining when the one or more first transmissions occur, the transmitter may then compute a link reliability metric for a link from the transmitter to the receiver by excluding one or more of the first transmissions from the indicated active transmission times of the second transmissions. In one embodiment, the active transmission times are in the past and the reliability metric excludes any first transmissions in the past during those times, while in another embodiment the active transmission times are scheduled in the future and the reliability metric does not include any first transmissions since the first transmissions may be scheduled to avoid the active transmission times.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example computer network 100 (e.g., wireless or otherwise) illustratively comprising nodes/devices 200 (e.g., labeled as shown, "root," "11," "12,"... "35"), which are interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
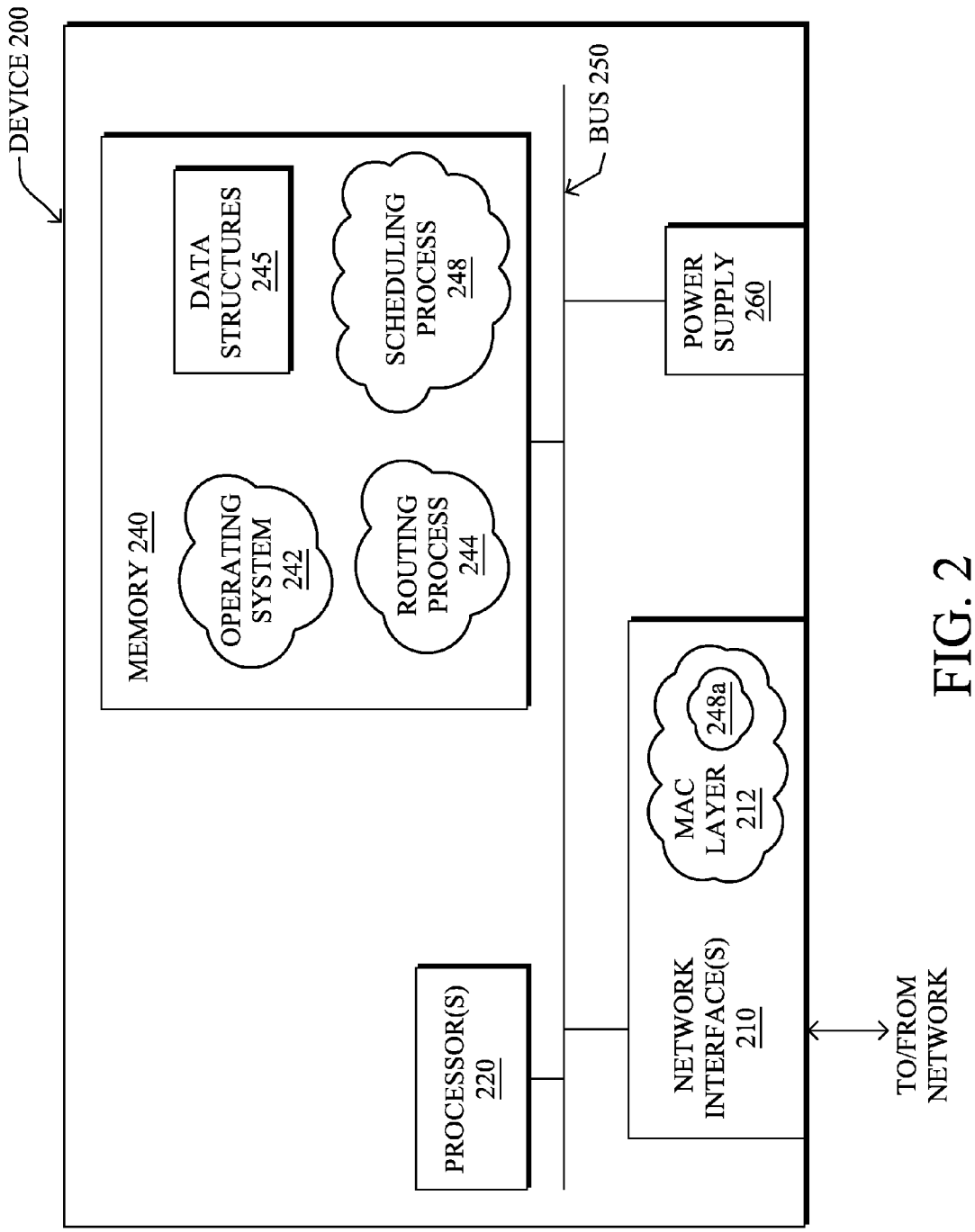
FIG. 2 illustrates an example device/node.

FIG. 2 is a schematic block diagram of an example node/device 200 that may be used with one or more embodiments described herein, e.g., as any of the nodes in FIG. 1 above. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 248 as described in greater detail below. Note that while scheduling process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
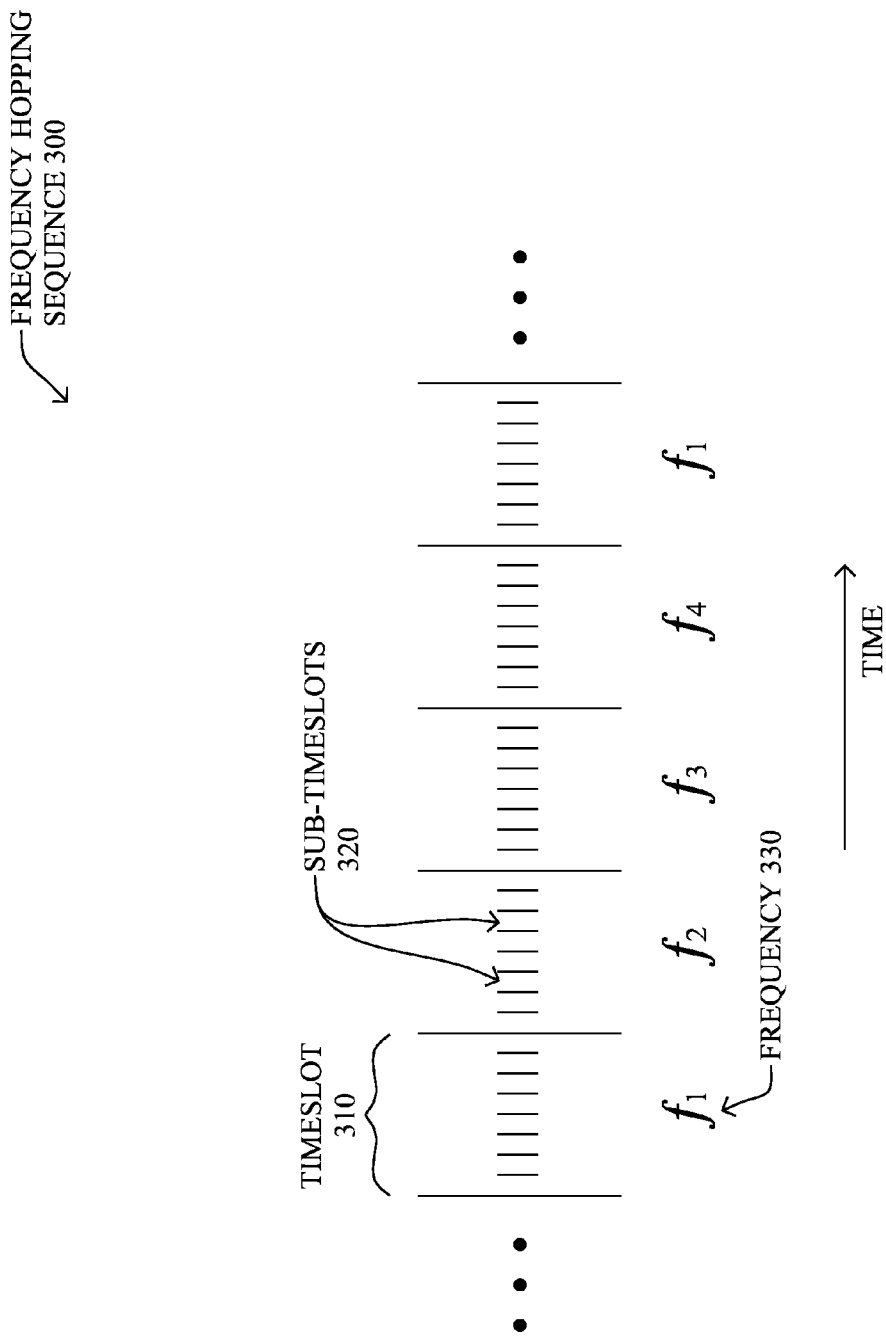
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, one objective of which generally being scheduling of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Carrier sense multiple access (CSMA) is a probabilistic MAC protocol in which a node verifies the absence of other traffic before transmitting in a shared-media communication network. Carrier sensing, in particular, directs a network interface to detect whether a carrier wave (the presence of another transmission from another device) is present on the shared-media network before trying to transmit. If a carrier is sensed, the device waits for the transmission in progress to finish before initiating its own transmission.

Figure 4A:
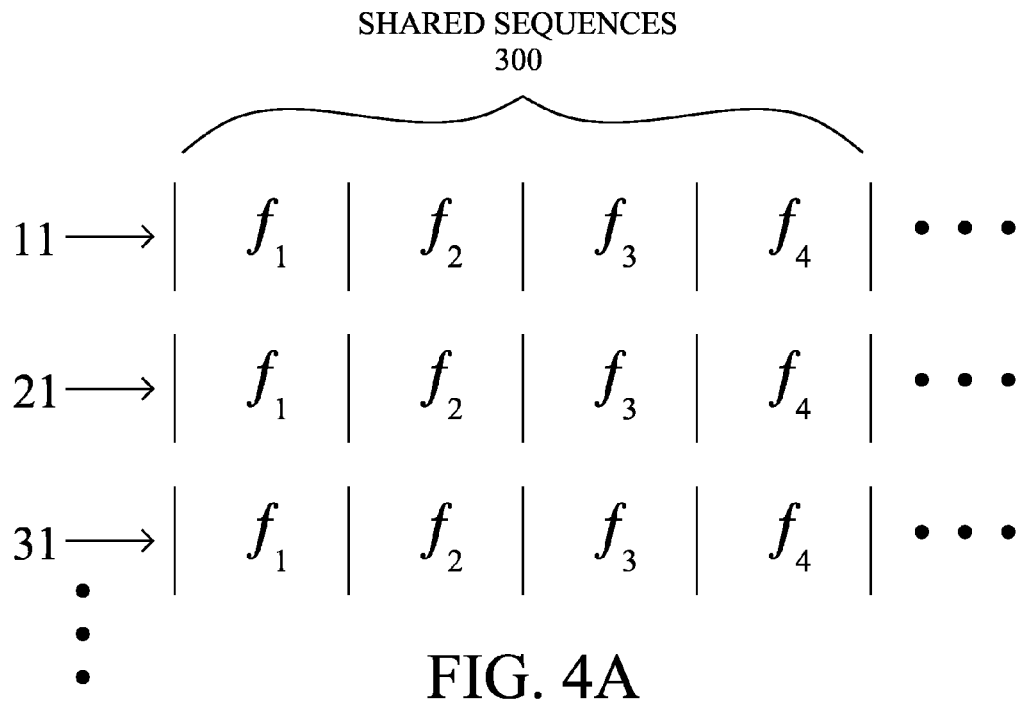
FIGS. 4A-4C illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g., shown for nodes 11, 12, and 33) are all configured with the same sequence (assume also that the other nodes of the network 100 use the same sequence).

Figure 4B:
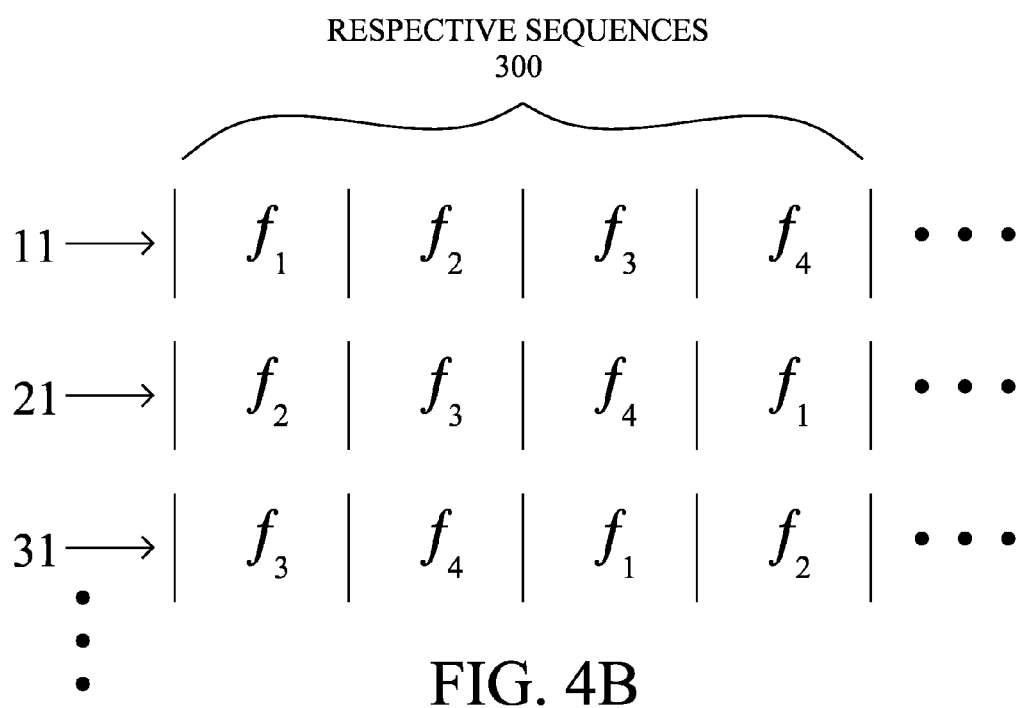

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

Figure 4C:
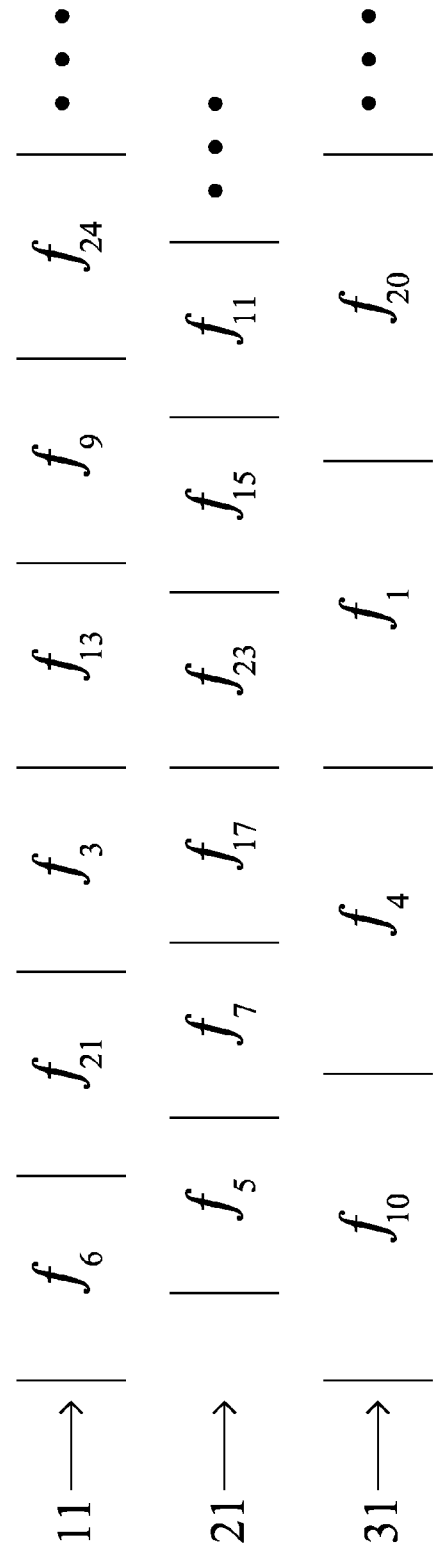

Note that the offset of the frequencies in FIG. 4B (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other. For example, FIG. 4C illustrates another example of independently determined listening schedules 300 that may be computed by each individual device in the network 100 (again, only nodes 11, 12, and 13 are shown for brevity). Note how there is generally no overlap at any given time (a goal of a typical scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, many communication devices, particularly in LLNs, typically communicate using only a single transceiver due to cost or energy constraints, which generally can only be configured to transmit or receive on a single channel at a time. Because a narrow-band transceiver is limited to a single channel and is half-duplex, determining packet loss reasons (and metrics, such as "ETX," an expected transmission count to reach a destination) effectively in a CSMA-based network can be challenging.

In particular, when a device, e.g., node 31, fails to receive an acknowledgment from another device, e.g., node 21, it does not know if the transmission was lost due to link quality issues or simply because node 21 was tuned to a different channel and/or transmitting at the same time. Note that these challenges do not exist in time division multiple access (TDMA)-based networks because in TDMA networks transmissions are scheduled across all transmitter-receiver pairs in the network in a way that guarantees no such collisions will occur. However, compared to CSMA-based systems, TDMA-based systems incur additional overhead for synchronization and scheduling and are less flexible to changing conditions.

CSMA-based systems typically employ random backoffs and clear-channel assessment mechanism to help avoid collisions. However, in a channel-hopping system, the traditional clear-channel assessment mechanism no longer applies. In particular, consider a simplified portion of network 100 comprising nodes 31 ->21 ->11, where node 31 is forwarding packets to node 21 and node 21 is forwarding packets to node 11.

Because a CSMA-based network allows devices to begin transmission at any time, both node 31 and node 21 may choose to begin forwarding packets simultaneously. In a single-channel network, node 31 can utilize clear-channel assessment techniques to detect whether or not node 21 is already attempting to forward a packet to node 11. However, in a channel-hopping network, node 31 and node 21 may be transmitting on different channels. Furthermore, because the channel-hopping sequence is local to each transmitter receiver pair (i.e., the channel-hopping sequence for sending packets to node 21 is different than for sending packets to node 11), node 31 may not know what channel node 21 is transmitting on. As a result, the clear-channel assessment is no longer useful to detect whether or not node 21 is currently transmitting a message. Furthermore, node 31 may not hear the packet sent by node 21 to 11, even if they were using the same channel.

This challenge is compounded by the fact that when node 31 transmits a message to node 21 and receives no acknowledgment, node 31 does not know the cause of the packet drop. In particular, node 31 does not know if there was simply a transmission failure (e.g., due to external interference or temporary fading) in the data or acknowledgment packet or if node 21 was simply busy transmitting on a different channel.

As further noted above, it could be argued that transmissions while the intended receiver was busy should be included in a link reliability metric, e.g., ETX. However, doing so conflates link reliability with link congestion and utilization. That is, the link may actually be quite reliable, and the transmissions regularly reach the intended receiver, but due to overlapping transmissions, the receiver may not be able to "pick up" the transmission.

It is known that the ability to separate out actual transmission failures from congestion can significantly increase system performance, especially in a lossy environment such as LLNs. In particular, searching for a different route may best solve link reliability issues, while on the other hand, simply slowing down the transmission rate to reduce congestion may solve congestion issues.

Improved Link Reliability Metrics

The techniques described herein allow a device to determine when an intended receiver was transmitting in the past and/or when it may transmit in the future, such that with past transmission information, a device can better compute link reliability estimates (e.g., ETX) in a CSMA-based channel-hopping network, and with future transmission information, a device can better schedule transmissions to avoid those times when the intended receiver may also be transmitting. In particular, as described herein, a device may include past and future transmission timing information in packets that it transmits. Neighboring devices may utilize the past transmission information to better compute link reliability metrics by excluding those transmissions that may have occurred while the intended receiver was also transmitting. Devices may also utilize the future transmission information to avoid transmitting messages when the intended receiver is likely to be transmitting and possibly utilize a different receiver (e.g., an alternate parent).

Specifically, according to one or more embodiments of the disclosure as described in greater detail below, a transmitter in a communication network receives an indication of active transmission times of a receiver to which the transmitter attempts to reach with one or more first transmissions, the active transmission times indicating respective times of one or more second transmissions initiated by the receiver. Based on determining when the one or more first transmissions occur, the transmitter may then compute a link reliability metric for a link from the transmitter to the receiver by excluding one or more of the first transmissions from the indicated active transmission times of the second transmissions. In one embodiment, the active transmission times are in the past and the reliability metric excludes any first transmissions in the past during those times, while in another embodiment the active transmission times are scheduled in the future and the reliability metric does not include any first transmissions since the first transmissions may be scheduled to avoid the active transmission times.

Illustratively, the techniques described herein may be performed by hardware, software, and/or firmware, such as in accordance with scheduling process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Operationally, the techniques herein are generally composed of the following components: 1) communicating past transmission information; 2) communicating future transmission information; 3) utilizing past transmission information; and 4) utilizing future transmission information. For instance, a system in accordance with the techniques herein introduces the concept of providing transmission information to improve link quality estimation and transmission reliability, e.g., particularly in a CSMA-based channel-hopping network. As described below, this may be achieved by: 1) maintaining state on the timing of past transmissions, e.g., by using a circular bit-vector to record whether or not a transmission occurred during the last X slots, 2) including a snapshot of the past transmission bit-vector in some or all transmitted packets to notify neighboring devices of past transmissions, 3) recording which slots future transmissions will occur by using a circular bit-vector, 4) including a snapshot of the future transmission bit-vector in some or all transmitted packets to notify neighboring devices of future transmissions, 5) using past transmission information to more accurately compute link reliability by excluding transmissions that occurred while the intended receiver may have also been transmitting, and 6) using future transmission information to avoid transmissions when the intended receiver is schedule to transmit and drive selection of alternative receivers.

Generally speaking, a transmitter (e.g., node 21) may generate a local indication of locally active transmission times that indicate respective times of the transmitter's transmissions, past or future, and transmits this indication to one or more of its neighbors (e.g., node 11, node 22, node 31, and/or node 32).

Figure 5:
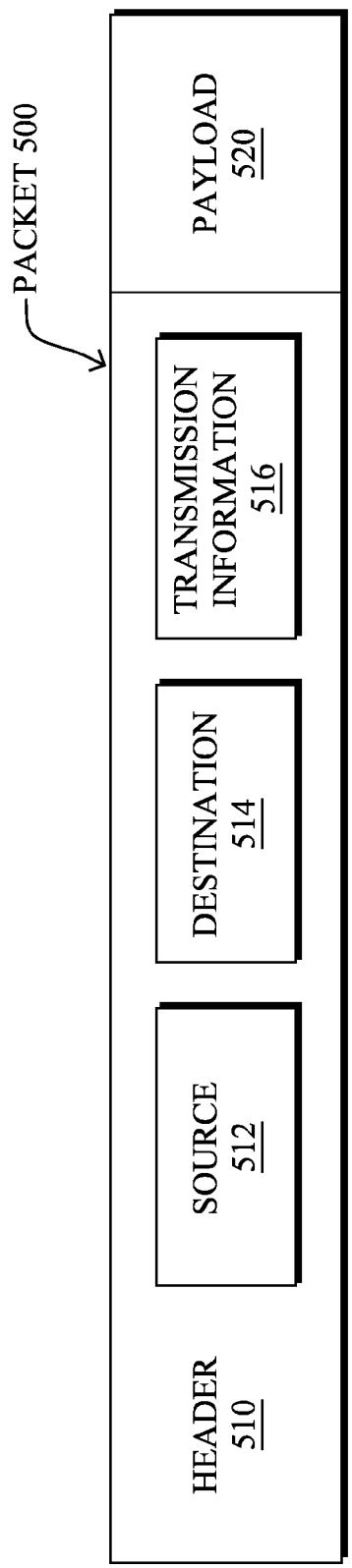
FIG. 5 illustrates an example packet format.

Specifically regarding the communicating of past transmission information, a device may include a snapshot of past transmission in packets 140 that it transmits. For example, FIG. 5 illustrates an example packet format (hereinafter "packet 500"), which comprises, generally, at least one header 510 and a payload 520, as may be appreciated by those skilled in the art. Illustratively, the header 510 may comprise one or more fields used to forward the packet, such as a source 512 and destination 514 (or other labels, checksums, etc.). In addition, according to the techniques herein, an illustrative "transmission information" field 516 may also be included within the header (e.g., an additional field, an extension header, etc.). For example, with IEEE 802.15.4e frame formats, the information field 516 may be included ("piggy-backed") in any broadcast or unicast frame using an Information Element. Broadcast frames are useful because it provides such information to all neighbors. Also, acknowledgment frames are useful because it provides information to a device that will be updating link reliability metrics after receiving an acknowledgment.

With enough resources, a device could simply record the start and end times for each transmission and include those timestamp pairs in transmitted packets. However, the overhead of maintaining and transmitting such timestamp pairs may be prohibitive given the resource constraints (limited memory and throughput) typical to LLN devices. Accordingly, in another illustrative embodiment, a device instead indicates which timeslots 310 in its channel-hopping schedule 300 it had to suspend due to a transmission operation.

Figure 6:
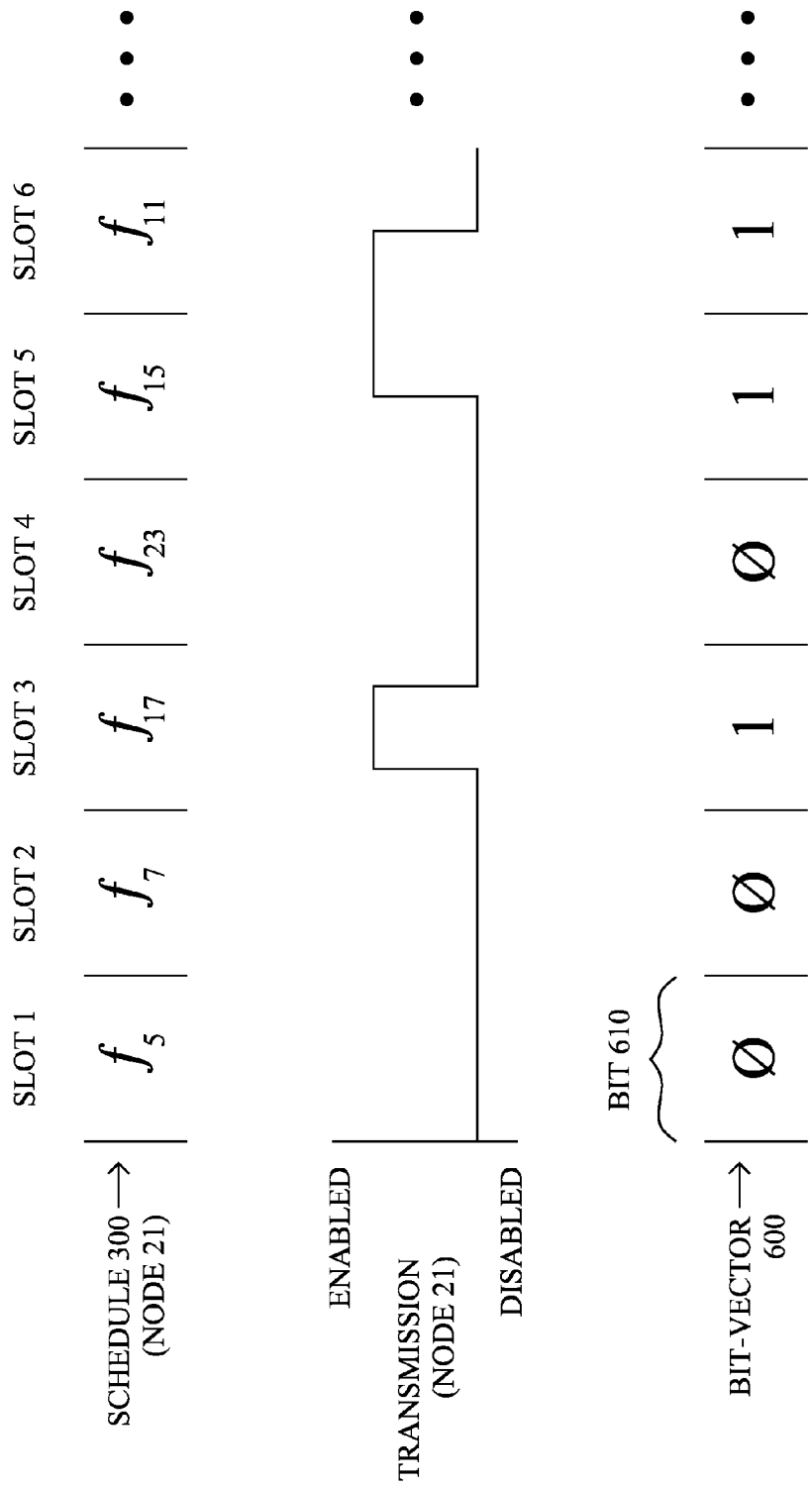
FIG. 6 illustrates an example bit-vector based on transmission timing.

Specifically, in one or more embodiments herein, a device may maintain a bit-vector for the most recent X slots in its channel-hopping schedule 300. FIG. 6 illustrates an example bit-vector 600 (e.g., simplified to six bits 610 for discussion herein) that may be populated according to the techniques herein. Assuming the channel/frequency-hopping schedule 300 for node 21, for instance, each bit corresponds to each timeslot 310 of the schedule 300, where the bits of the bit-vector may be set depending upon whether node 21's transmitter was enabled or disabled during a corresponding timeslot. That is, if the k-th bit of the bit-vector 600 is set, then the device was transmitting during the k-th most recent timeslot. For example, the device may maintain the bit-vector 600 as follows:

1) At the beginning of a timeslot, set the bit number k=n % X, where n is the timeslot number and X is the number of bits;
2) Then set the k-th bit if already transmitting, otherwise clear the k-th bit; and
3) If at any time during timeslot n the device begins transmitting, then set the k-th bit.

Notably, indicating which timeslots the device was transmitting represents a compromise in the timing resolution. However, while a bit-vector does not indicate exact times at which the transmission occurred, a bit-vector of length 32 is sufficient to maintain 4 seconds of history in an example frequency-hopping schedule that uses 125 ms timeslots. Another advantage of using a bit-vector 600, also, is that it allows a device to maintain and communicate constant state regardless of the number of messages it transmitted within a particular timeslot.

According to one or more additional or alternative embodiments herein, future transmission information may also be communicated. Specifically, a device may have a number of messages queued for transmission. As such, the device may schedule transmissions for those messages, for example, in response to first determining that a particular transmission can be delayed into the future (e.g., such as from a "DS" bit to determine a quality of service (QoS) delay requirement), or else in response to simply having planned or designated transmission times for any transmissions. The device may then indicate this time to the device's neighbors, and transmits the particular transmission at the time indicated. Illustratively, similar to the way a device communicates past transmission information, a device may communicate future transmission information using a bit-vector 600. e.g., in information field 516.

In accordance with one or more of the embodiments herein, when the indicated active transmission times are for transmissions that have already occurred, the techniques herein may use such past transmission information to adjust calculation of an associated link reliability metric. For example, one common measurement of link reliability metric is ETX : the estimated number of transmissions before successfully receiving an acknowledgment. The ETX is typically computed as the inverse of packet-success rate. A simple way to obtain an ETX value is to count the number of transmission attempts and divide it by the number of transmissions that were successfully acknowledged.

To help obtain an ETX value that accurately reflects the link reliability rather than congestion, any transmissions that occurred while the intended receiver was also transmitting should not be included in the ETX calculation. Because the device may only learn that the intended receiver was transmitting after such events occur (i.e., if only past transmission information is used), then the device maintains state for its own recent transmissions. This may be done by timestamping transmissions or maintaining a count (number) of transmissions during each of the intended receiver's channel-hopping timeslots.

Figure 7A:
FIGS. 7A-7B illustrate an example of link reliability metric computation.

FIG. 7 illustrates an example table 700 (e.g., data structure 245) that may be used to maintain past transmission times (though any suitable storage configuration may be used). For example, from the perspective of node 31, the table corresponding to node 21 (the intended receiver) may comprise a listing of past transmissions to node 21 (field 705), and an indication of a particular timeslot (field 710) during which the transmission was attempted. Acknowledgment field (ACK field 715) indicates whether the transmission was successful. Assume, for instance, a first entry shows that a transmission identified as "A" was transmitted to from node 31 to node 21 during node 21's timeslot "1", and it was not received (ACK="N"). Conversely, transmission "B" during timeslot "1" was received (ACK="Y"). Without any additional information, based on these seven transmissions (A-G), four transmissions were received, and the calculated ETX would be 7/4, or 1.75.

Figure 7B:
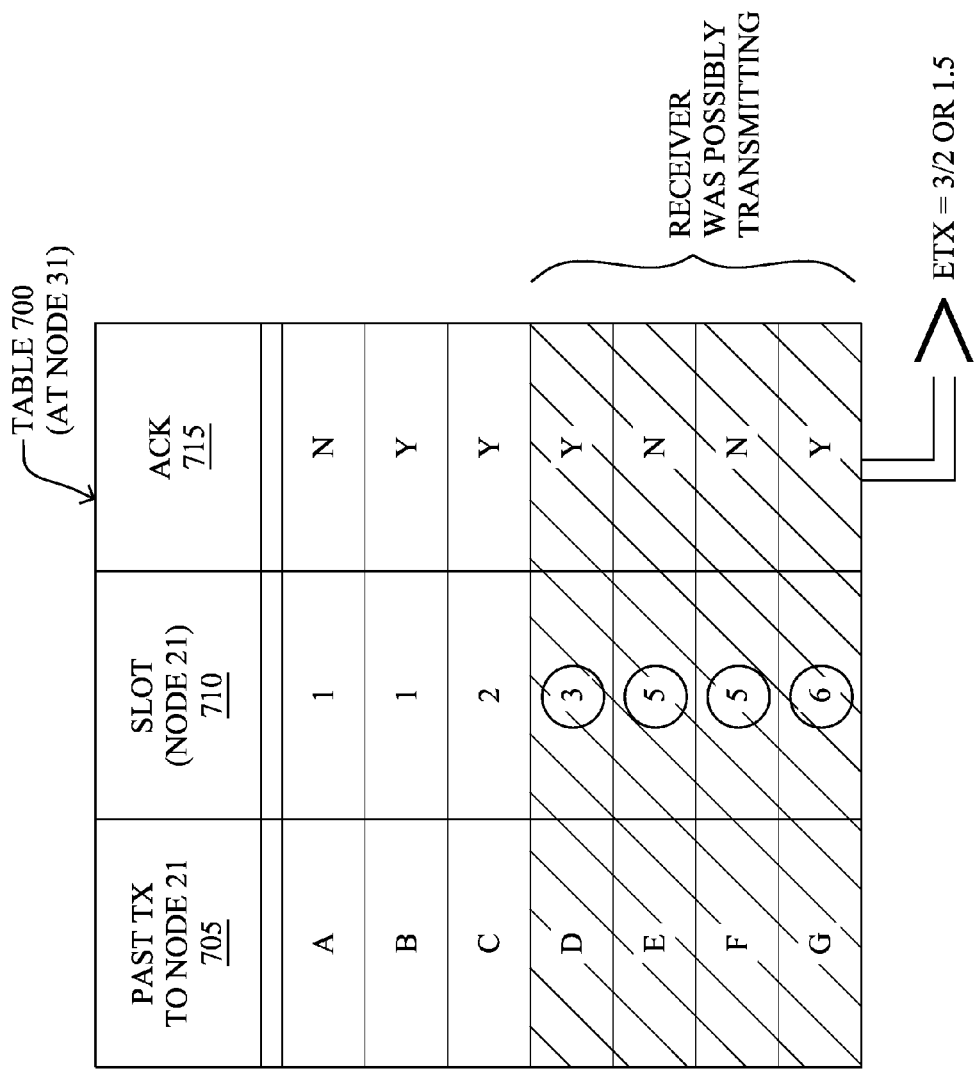

According to one or more of the embodiments herein, however, and as shown in FIG. 7B, the information of past transmissions from the intended receiver may be used to adjust the calculated link reliability metric (e.g., ETX). For instance, an illustrative process for maintaining ETX information first records transmission times of the transmitter (e.g., node 31) using timestamps or bit-vector approach as mentioned above. Based on receiving past transmission information from the intended receiver (e.g., node 21) as in the bit-vector 600 shown in FIG. 6, transmission records are removed that occurred while the intended receiver was also transmitting. That is, computing the link reliability metric comprises excluding the transmitter's transmissions to the intended receiver that occurred during the active transmission times of the receiver. As shown in FIG. 7B, then, any transmissions that occurred during timeslots 3, 5, or 6 are excluded from the calculation, and as an example result, a more accurate link reliability metric may be calculated, e.g., ³⁄₂, or 1.5.

Note that in the event transmissions occurred before the earliest information available on past transmissions (e.g., more than four seconds ago when using a 32-bit window with 125 ms timeslots), then any of success/failure entries for the transmitter's transmissions outside of the window may either be utilized for a greater number of data points, or else ignored to remove the occurrence of lost packets possibly due to congestion and/or collision.

Note also that both transmission success and failure events are excluded when the intended receiver has indicated a transmission event during the same timeslots. Excluding transmission success may not seem intuitive since the intended receiver must have been listening on the proper channel to successfully receive and acknowledge a transmission. However, only excluding failure events may bias the ETX calculation towards higher reliability than the link actually provides. By excluding both successful and failure events, any bias should eventually balance out over time, e.g., assuming that the occurrence of false-positives is independent.

Also, because ETX calculations typically operate using a low-pass filter with much longer time constants, adding several seconds of delay is generally insignificant. Furthermore, because the time between the initial transmission and a successful acknowledgement on a link with reasonable reliability is typically short (e.g., less than several seconds), an information window of four seconds is generally sufficient.

Lastly, to use future transmission information in accordance with one or more additional or alternative embodiments herein, a device may record any future transmission information it receives from a neighboring device, i.e., active transmission times for a receiver's transmissions that are scheduled to occur in the future. When scheduling transmissions for queued messages, the device may be able to avoid transmissions during those timeslots that are marked since the intended receiver will also be transmitting during those slots. That is, the transmitter (e.g., node 31) may schedule its transmissions to an intended receiver (e.g., node 21) to not transmit to the receiver during the receiver's transmission times. Note that in this sense, computing the link reliability metric (e.g., ETX) comprises excluding transmissions during the receiver's transmission times from the calculation since there aren't any transmissions transmitted during those times. Furthermore, it should be noted that a device may choose to forward messages to a different receiver to avoid any added communication latency, such as to an alternate next-hop device or parent (e.g., from node 31 to node 32).

Figure 8:
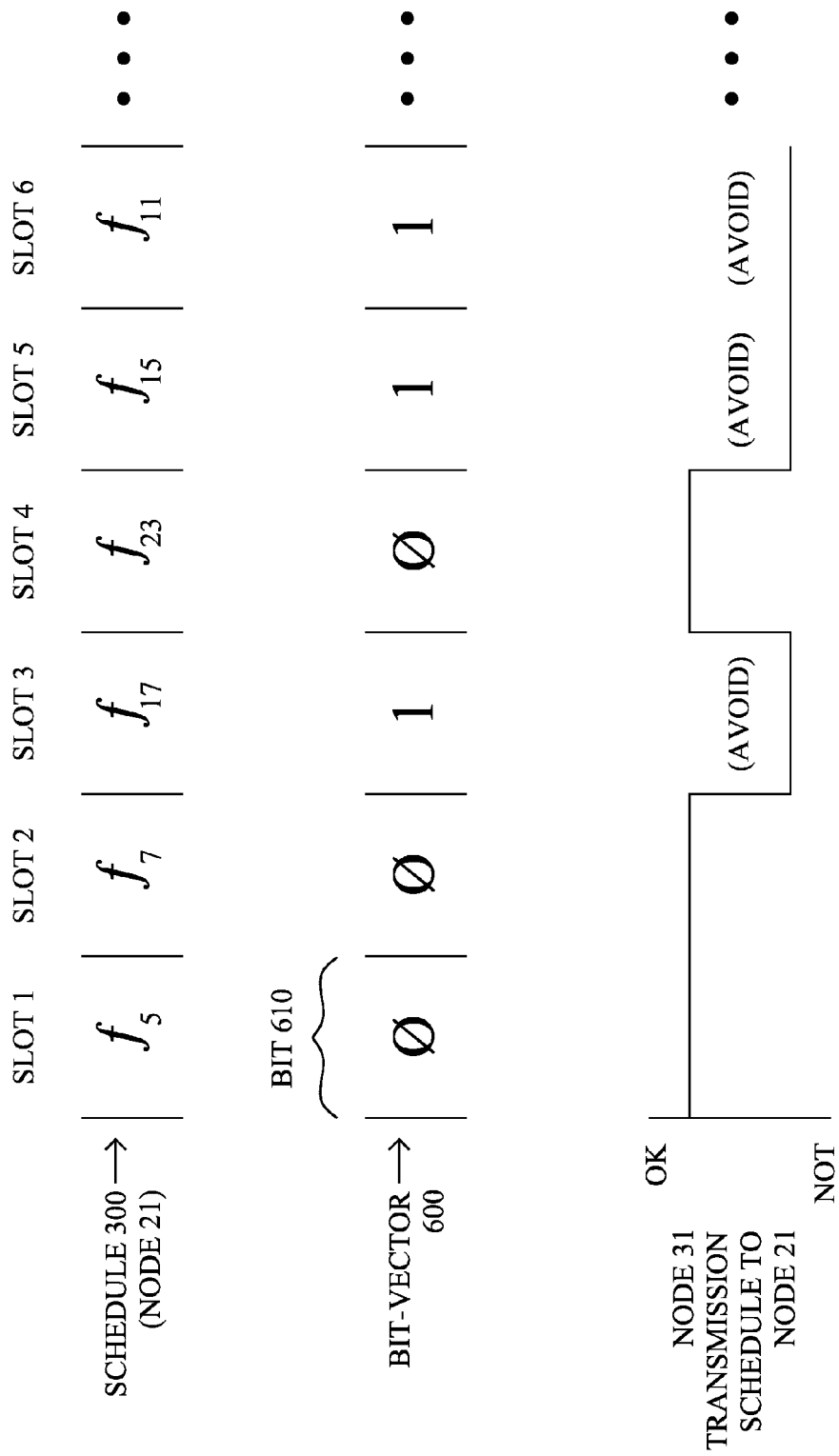
FIG. 8 illustrates an example of transmission scheduling.

FIG. 8 illustrates the scheduling of a transmitter's future transmissions based on information regarding an intended receiver's future transmissions (e.g., assuming the same information received in FIG. 6 above, though now used to indicate future transmissions as opposed to past transmissions—note that the information may contain both past and future transmissions). As shown, the transmitting node (e.g., node 31) may determine times when it is acceptable ("OK") to transmit to the intended receiver node (e.g., node 21) and when it is generally advisable to not transmit ("NOT") based on the received transmission information. (Note that is may still be possible to reach the intended receiver when the granularity of the future transmission information is not precise, such as entire timeslots, however it may still be beneficial to avoid chancing the transmission if there is the opportunity to delay or otherwise schedule an intended transmission, accordingly.) In the example, therefore, node 31 may attempt to avoid scheduling a transmission to node 21 during node 21's timeslot 3, 5, or 6, in order to thus avoid any potential packet loss at node 21 (i.e., transmitting to node 21 while node 21 may not be listening due to its own transmissions).

Figure 9:
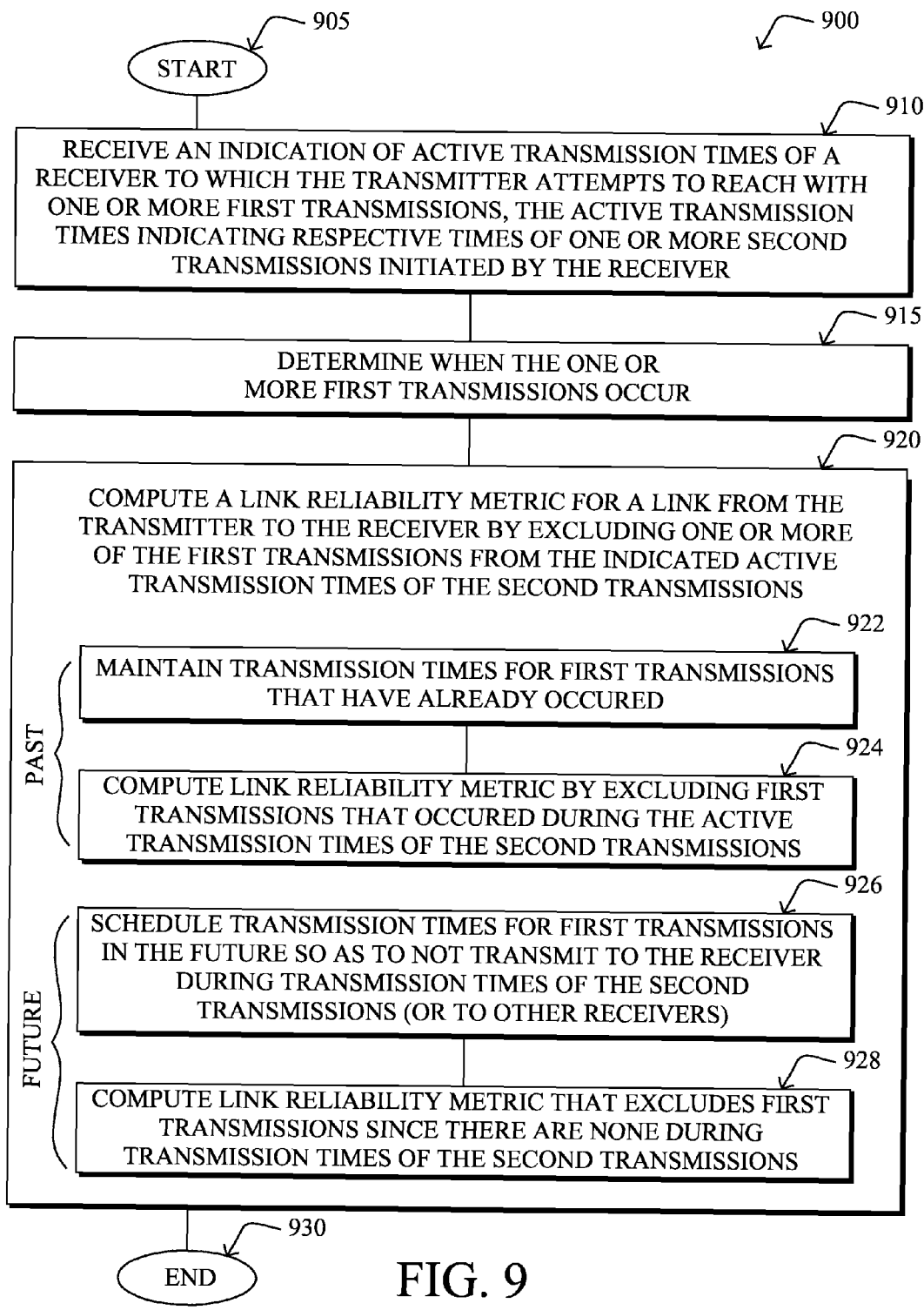
FIGS. 9-11 illustrate example simplified procedures and/or sub-procedures for improved link reliability metrics in communication networks.

FIG. 9 illustrates an example simplified procedure for improved link reliability metrics in communication networks in accordance with one or more embodiments described herein. The procedure 900 starts at step 905, and continues to step 910, where, as described in detail above, a node in the communication network 100, e.g., node 31, receives an indication of active transmission times of a receiver, e.g., node 21, to which the transmitter attempts to reach with its own transmissions. As noted above, the active transmission times indicate respective times of transmissions initiated by the receiver, whether to node 31 or otherwise. In step 915, the transmitter may determine when its transmissions to the receiver occur (e.g., did occur and/or will occur), and in illustrative step 920, computes a link reliability metric (e.g., ETX) for the link from the transmitter to the receiver by excluding one or more of the transmitter's transmissions from the indicated active transmission times of the receiver's transmissions (e.g., actual timestamped times, or timeslot-based times).

As described above, where the transmission times for the receiver are in the past, in sub-step 922 the transmitter maintains transmission times for its transmissions that zo have already occurred, and thus in sub-step 924 may compute link reliability metric by excluding its own transmissions that occurred during the active transmission times of the receiver's transmissions. Conversely (or in addition), where the transmission times for the receiver are in the future, then in sub-step 926 the transmitter may schedule transmission times for its transmissions in the future so as to not transmit to the receiver during transmission times of the receiver's transmissions. As mentioned, the transmitter may schedule the transmissions to alternative receivers. In sub-step 928, then, the transmitter computes a link reliability metric that excludes its transmissions to the receiver since there are none during the receiver's scheduled transmission times.

The procedure 900 ends in step 930, illustratively with the ability to continue receiving updated transmission times, compute additional link reliability metrics, etc.

Figure 10:
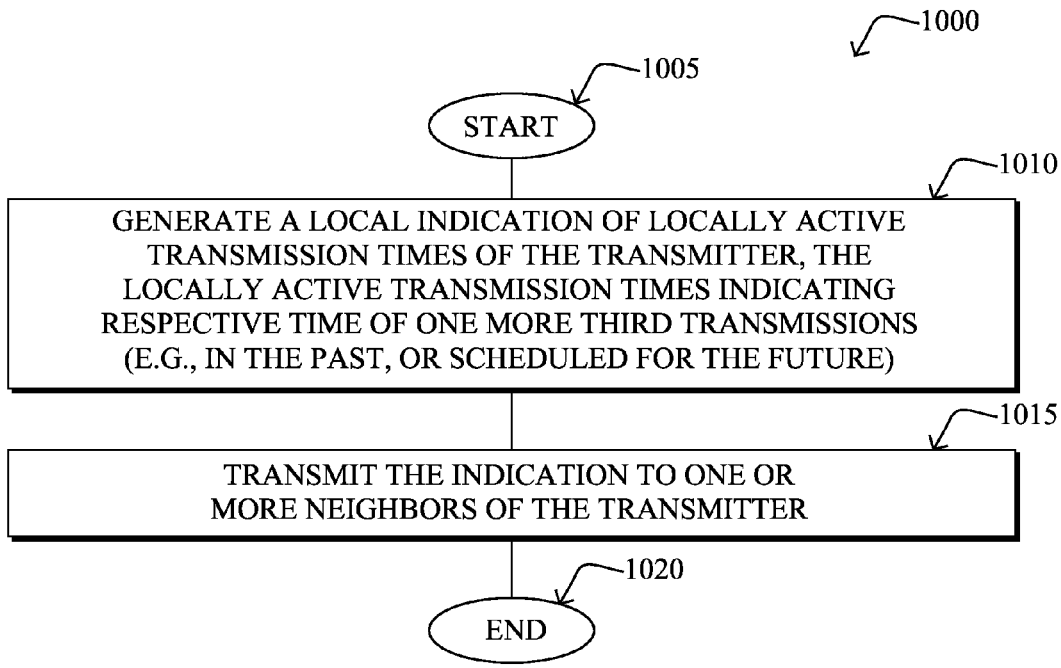

In addition, FIG. 10 illustrates an example simplified (sub-)procedure for improved link reliability metrics in communication networks in accordance with one or more embodiments described herein, e.g., from the perspective of node 21 in the example given in procedure 900 above. The procedure 1000 starts at step 1005, and continues to step 1010, where, as described in detail above, a node, e.g., node 21, generates a local indication of locally active transmission times of itself as a transmitter, the locally active transmission times indicating respective times of its transmissions (e.g., in the past, or scheduled for the future), as mentioned above. Accordingly, in step 1015, the transmitter transmits the indication to one or more neighbors of the transmitter (e.g., node 31 as noted above in procedure 900, but also to other neighbors, such as node 11, node 22, and node 32), and the procedure 1000 ends in step 1020.

Figure 11:
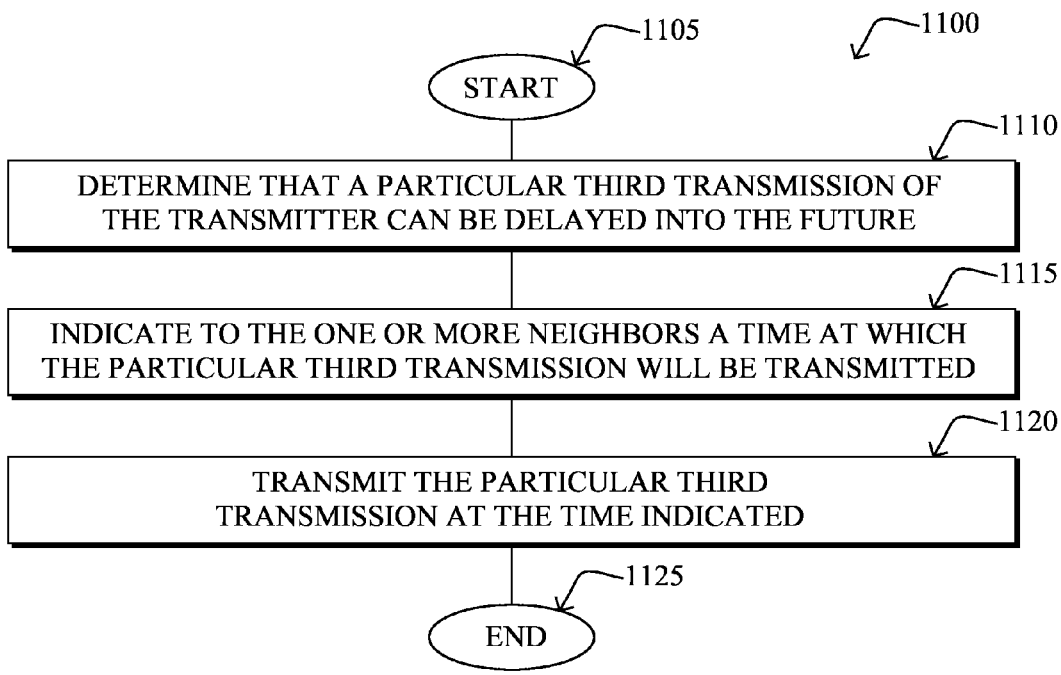

FIG. 11 illustrates another example simplified (sub-)procedure for improved link reliability metrics in communication networks in accordance with one or more embodiments described herein. The procedure 1100 starts at step 1105, and continues to step 1110, where, as described in detail above, a transmitter (e.g., node 21 as in the example above in procedure 1000 of FIG. 10) may determine that a particular transmission can be delayed into the future, and as such, the transmitter may indicate to its neighbors a time at which the particular transmission will be transmitted in step 1115 (i.e., a future scheduled active transmission time). Accordingly, in step 1120, the transmitter transmits the particular transmission at the time indicated, and the (sub-) procedure 1100 ends in step 1125.

It should be noted that while certain steps within procedures 900-1100 may be optional as described above, the steps shown in FIGS. 9-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1100 are described separately, certain steps from each procedure may be incorporated into each other procedure, and the procedures are not meant to be mutually exclusive.

The novel techniques described herein, therefore, provide for improved link reliability metrics in communication networks, for example, by attending to the issue of whether a packet loss was due to a low link quality or a receiver's not listening, as well as by informing transmitters of the receiver's future transmission to allow rescheduling or re-addressing another receiver to help increase the probability of success. In particular, a system in accordance with the techniques herein: 1) improves link quality estimation by excluding transmission information that may have occurred while the intended receiver was also transmitting, 2) better separates transmission failures due to link reliability issues and failures due to congestion by having a device indicate its past transmissions, 3) improves packet transmission reliability and reduces wasted resource due to failed transmissions by avoiding transmissions while an intended receiver is also scheduled to transmit, and 4) reduces communication latency by having a device learn of a receiver's future transmissions and possibly selecting another receiver that is less busy.

While there have been shown and described illustrative embodiments that provide for improved link reliability metrics in communication networks, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols, e.g., using frequency hopping, such as certain PLC protocols. Also, while the description above relates to packets, the techniques may be equally applicable to non-packetized transmissions. Moreover, while the above description is specifically discussed CSMA, the use of CSMA is not meant to be tied to any particular known protocol, but instead to the general concept of carrier sensing in shared-media networks, as may be appreciated by those skilled in the art. In fact, the techniques herein need not be associated with CSMA-based networks, and may be used with any type of network utilizing generally un-scheduled transmissions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a transmitter in a communication network, an indication of active transmission times of a receiver to which the transmitter attempts to reach with one or more first transmissions, the active transmission times indicating respective past and future times of one or more second transmissions initiated by the receiver;
determining when the one or more first transmissions occur; and
computing a link reliability metric for a link from the transmitter to the receiver by excluding one or more of the first transmissions from the indicated active transmission times of the second transmissions when the one or more first transmissions occur at a same time as the active transmission times of the second transmissions.

2. The method as in claim 1, the method further comprising:
maintaining transmission times for one or more first transmissions that have already occurred; and
wherein computing the link reliability metric comprises excluding the one or more first transmissions that occurred during the active transmission times of the second transmissions.

3. The method as in claim 2, wherein maintaining comprises one of either storing timestamps based on the first transmissions or storing a number of first transmissions that occurred during each timeslot of a frequency hopping schedule.

4. The method as in claim 1, the method further comprising:
scheduling transmission times for the one or more first transmissions in the future so as to not transmit to the receiver during transmission times of the second transmissions; and
wherein computing the link reliability metric comprises excluding the one or more first transmissions by not having any first transmissions transmitted during transmission times of the second transmissions.

5. The method as in claim 4, further comprising:
scheduling transmission times for one or more third transmissions in the future during transmission times of the second transmissions, the one or more third transmissions destined to an alternate receiver.

6. The method as in claim 1, further comprising:
operating according to a frequency hopping schedule with a plurality of timeslots, wherein the indicated transmission times comprise a list of timeslots during which the one or more second transmissions occur, wherein the list of timeslots during which the second transmissions occur comprises a bit-vector, wherein each bit of the bit-vector corresponds to a particular timeslot of the frequency hopping schedule timeslots, and wherein the setting of each bit indicates whether the corresponding timeslot is a timeslot during which the second transmissions occur.

7. The method as in claim 1, wherein the indication is received as piggybacked information in a particular transmission from the receiver.

8. The method as in claim 7, wherein the particular transmission from the receiver is selected from a group consisting of a unicast message and a broadcast message.

9. The method as in claim 1, wherein the link reliability metric is an expected transmission count (ETX).

10. The method as in claim 1, further comprising:
generating a local indication of locally active transmission times of the transmitter, the locally active transmission times indicating respective times of one or more third transmissions comprising the one or more first transmissions and zero or more other transmissions; and
transmitting the indication to one or more neighbors of the transmitter.

11. The method as in claim 10, wherein the active transmission times are for third transmissions that have already occurred.

12. The method as in claim 10, wherein the active transmission times are for third transmissions that are scheduled to occur in the future.

13. The method as in claim 10, further comprising:
operating according to a frequency hopping schedule with a plurality of timeslots, wherein the indicated transmission times comprise a list of timeslots during which the one or more third transmissions occur, wherein the list of timeslots during which the third transmissions occur comprises a bit-vector, wherein each bit of the bit-vector corresponds to a particular timeslot of the frequency hopping schedule timeslots, and wherein the setting of each bit indicates whether the corresponding timeslot is a timeslot during which the third transmissions occur.

14. The method as in claim 10, wherein the indication is transmitted as piggybacked information in a particular transmission from the transmitter to one or more of the neighbors.

15. The method as in claim 10, further comprising:
determining that a particular third transmission of the transmitter can be delayed into the future;
in response, indicating to the one or more neighbors a time at which the particular third transmission will be transmitted; and
transmitting the particular third transmission at the time indicated.

16. An apparatus, comprising:
a processor;
a transceiver configured to communicate in a communication network; and
a memory configured to store a process executable by the processor, the process when executed by the processor operable to:
receive an indication of active transmission times of a receiver to which the apparatus attempts to reach with one or more first transmissions, the active transmission times indicating respective past and future times of one or more second transmissions initiated by the receiver;
determine when the one or more first transmissions occur; and
compute a link reliability metric for a link from the apparatus to the receiver by excluding one or more of the first transmissions from the indicated active transmission times of the second transmissions when the one or more first transmissions occur at a same time as the active transmission times of the second transmissions.

17. The apparatus as in claim 16, wherein the process when executed is further operable to:
maintain transmission times for one or more first transmissions that have already occurred; and
wherein computing the link reliability metric comprises excluding the one or more first transmissions that occurred during the active transmission times of the second transmissions.

18. The apparatus as in claim 16, wherein the process when executed is further operable to:
schedule transmission times for the one or more first transmissions in the future so as to not transmit to the receiver during transmission times of the second transmissions; and
wherein computing the link reliability metric comprises excluding the one or more first transmissions by not having any first transmissions transmitted during transmission times of the second transmissions.

19. The apparatus as in claim 16, wherein the process when executed is further operable to:
operate according to a frequency hopping schedule with a plurality of timeslots, wherein the indicated transmission times comprise a list of timeslots during which the one or more second transmissions occur, wherein the list of timeslots during which the second transmissions occur comprises a bit-vector, wherein each bit of the bit-vector corresponds to a particular timeslot of the frequency hopping schedule timeslots, and wherein the setting of each bit indicates whether the corresponding timeslot is a timeslot during which the second transmissions occur.

20. The apparatus as in claim 16, wherein the indication is received as piggybacked information in a particular transmission from the receiver.

21. The apparatus as in claim 16, wherein the process when executed is further operable to:
generate a local indication of locally active transmission times of the apparatus, the locally active transmission times indicating respective times of one or more third transmissions comprising the one or more first transmissions and zero or more other transmissions; and
transmit the indication to one or more neighbors of the apparatus.

22. The apparatus as in claim 21, wherein the active transmission times are for third transmissions that have already occurred.

23. The apparatus as in claim 21, wherein the active transmission times are for third transmissions that are scheduled to occur in the future.

24. A tangible, non-transitory, computer-readable media having software encoded thereon, the software, when executed by a processor on a transmitter in a communication network, operable to:
receive an indication of active transmission times of a receiver to which the transmitter attempts to reach with one or more first transmissions, the active transmission times indicating respective past and future times of one or more second transmissions initiated by the receiver;
determine when the one or more first transmissions occur; and
compute a link reliability metric for a link from the transmitter to the receiver by excluding one or more of the first transmissions from the indicated active transmission times of the second transmissions when the one or more first transmissions occur at a same time as the active transmission times of the second transmissions.

25. The computer-readable media as in claim 24, wherein the software when executed is further operable to:
generate a local indication of locally active transmission times of the transmitter, the locally active transmission times indicating respective times of one or more third transmissions comprising the one or more first transmissions and zero or more other transmissions; and
transmit the indication to one or more neighbors of the transmitter.

* * * * *